March 21, 1944.  W. W. HUTCHESON ET AL  2,344,700
APPARATUS FOR RECTIFYING SPIRITS AND FOR SIMILAR PURPOSES
Filed Aug. 20, 1942

INVENTORS:
WILLIAM WOOD HUTCHESON
WILLIAM CUTHILL MASON
BY Haseltine Lake & Co. ATTORNEYS Patented Mar. 21, 1944

2,344,700

UNITED STATES PATENT OFFICE 2,344,700

APPARATUS FOR RECTIFYING SPIRITS AND FOR SIMILAR PURPOSES

William Wood Hutcheson and William Cuthill Mason, London, England

Application August 20, 1942, Serial No. 455,544
In Great Britain March 19, 1942

1 Claim. (Cl. 261—114)

This invention relates to apparatus for rectifying spirits, such as alcohol or acetone, and for similar purposes, as for example for petroleum distillation and for the preparation of liquid oxygen. The apparatus to which the invention is applicable is of the kind comprising a column of superimposed chambers each provided with a dip pipe for the passage of liquid into the next lower chamber, and with nozzles and bubble caps or bells for the passage of vapour from the said lower chamber, heating means and a drainage trap being usually provided at the bottom of the column, and an inlet for liquid and outlet for vapour being provided at the top of the column. The chief object of the invention is to enable the total height of the column, which is usually 20 feet or more, to be reduced approximately to half its usual height. This is achieved according to the invention by giving a double rectification or scrubbing action to the vapour in each chamber instead of the single rectification which is normally practised, so that the number of chambers required for any specific duty is halved. To enable this to be accomplished, on the rectifying plate or tray forming the floor of each chamber is provided an upstanding baffle plate dividing the chamber into two compartments, leaving a space at the top of the chamber to allow the vapour to pass from one compartment to the next compartment on the same level, the lower part of this baffle being perforated to allow the refluxed solvent or liquid to flow across the plate from one dip pipe to the other. The perforations are set low enough to prevent the vapour blowing through the seal of liquid and through the baffle. One half of the upper surface of the plate is fitted with rectifying bells or bubble caps and nozzles, which may be of normal design, and from the lower surface of the plate below the nozzles depend short pipes of approximately the same diameter as the bells, the lower edges of these pipes being preferably serrated and arranged to dip into the liquid on the tray immediately below, thus giving the vapours a double rectification in passing each tray or plate.

Figure 1:
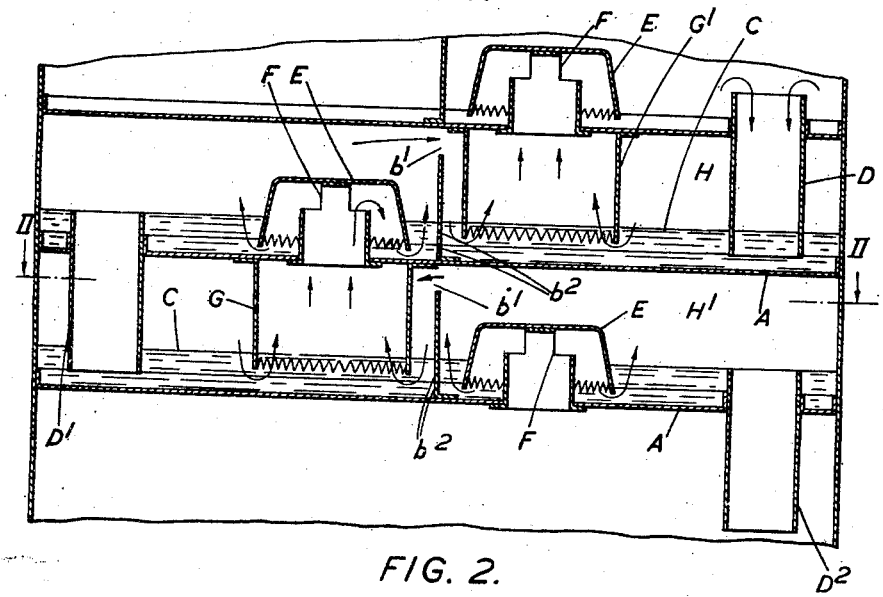
Figure 2:
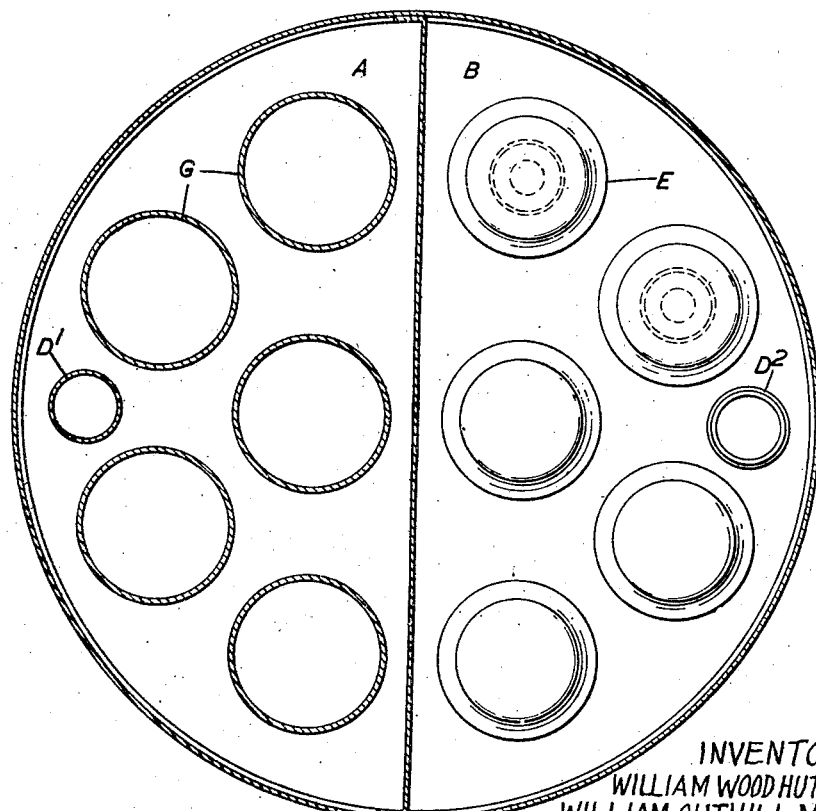

In order that the present invention may be clearly understood and readily carried into effect, the same will now be further described with reference to the accompanying drawing or diagrams illustrating an exemplification of the invention, wherein Figure 1 represents a portion of the rectifying column in vertical section and Figure 2 represents a horizontal section taken on the line II—II in Figure 1.

A indicates the plate forming the bottom of each chamber, B the baffle. At the top of the baffle in each chamber is an opening $b'$, and near the bottom are perforations $b^2$ well below the liquid level C. D, D', $D^2$ indicate dip pipes, one leading into an individual chamber and the other leading out of the said chamber. E indicates bells over the nozzles F; G and G' indicate the pipes below the said nozzles which pipes extend below the level of the liquid.

It will be seen that the liquid arriving in the chamber H through the dip pipe D can pass through the perforations $b^2$ to the dip pipe D' into the chamber H', thence returning through lower perforations $b^2$ to the dip pipe $D^2$. The vapours set free from the liquid by the action of heat will rise through the pendent pipes G, through the nozzles F, and escape under the lower edges of the bells E into the upper part of the chamber, whence they pass through the liquid in the next higher chamber into the pipes G' of the said higher chamber, and so on. Thus the vapours pass twice through the liquid in each chamber, and thereby undergo a double rectification.

What we claim and desire to secure by Letters Patent of the United States is:

Apparatus of the kind referred to comprising a plurality of superposed chambers the floor of each of which consists of a liquid supporting tray or plate, an upstanding baffle plate on each tray dividing each chamber into two compartments said baffle plate terminating short of the tray above so as to leave a space to allow vapor to pass from one compartment to another of the same chamber, a dip pipe in one of said compartments leading to the chamber below and a dip pipe in the other of said compartments leading to the chamber above, the baffle plate being perforated below the level of the liquid to allow refluxed solvent or liquid to flow across the tray of each chamber from one dip pipe to the other, a bubble cap in one of said compartments having a nozzle communicating with the chamber below and a short pipe in the other of said compartments communicating with the nozzle of the bubble cap of the chamber above, said short pipe at its lower end dipping into the liquid on the tray.

WILLIAM WOOD HUTCHESON.
WILLIAM CUTHILL MASON.